United States Patent Office 2,723,955
Patented Nov. 15, 1955

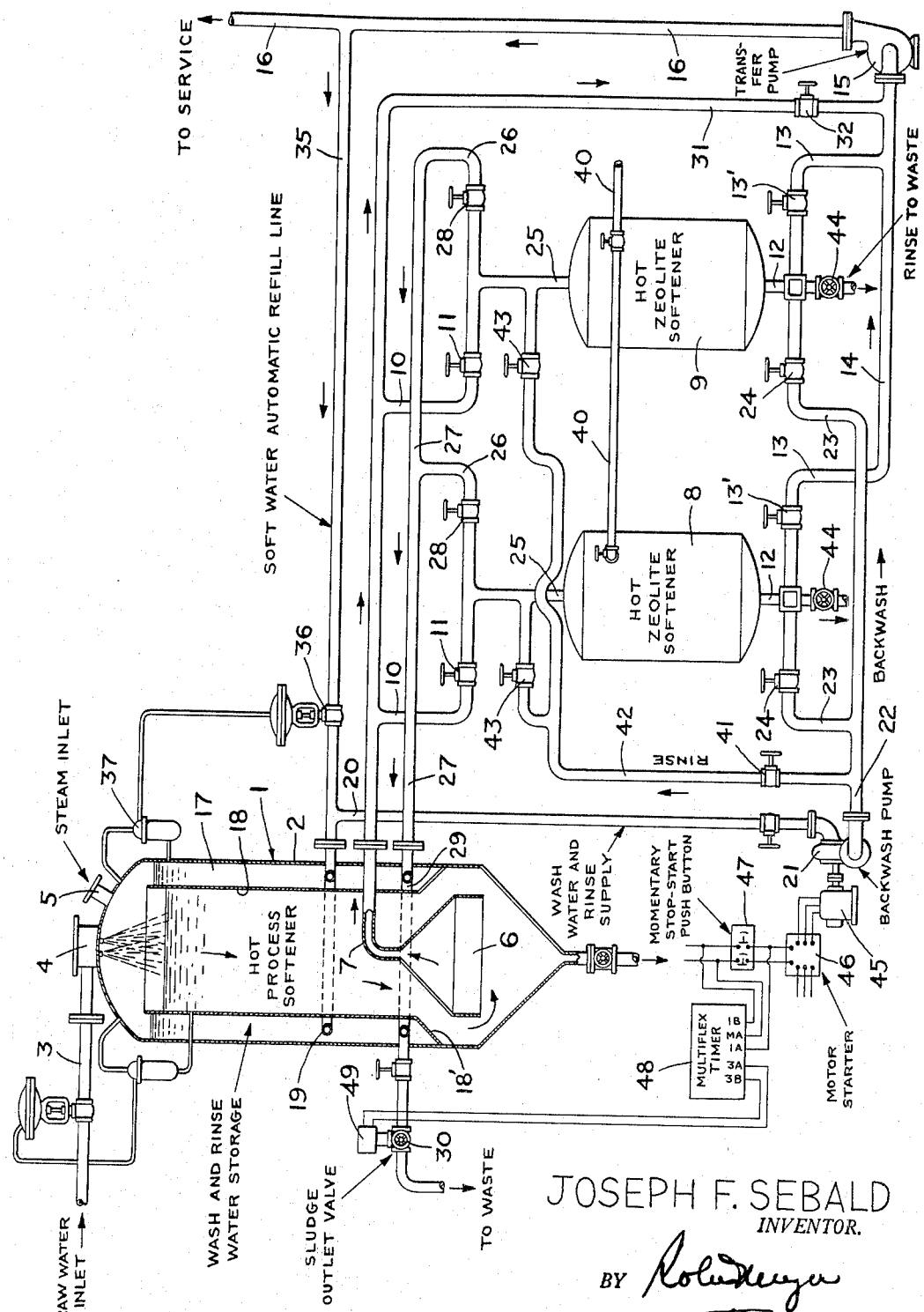

2,723,955

WATER TREATING APPARATUS

Joseph F. Sebald, Bloomfield, N. J., assignor, by mesne assignments, to Cochrane Corporation, Philadelphia, Pa., a corporation of Pennsylvania Application November 27, 1951, Serial No. 258,331

7 Claims. (Cl. 210—14)

This invention relates to water treating apparatus and more particularly to a conventional hot process water softener with a zeolite softener added in series for the purpose of filtering the effluent from the hot process softener and removing all residual hardness.

An object of the present invention is to provide, an apparatus of this type, means for supplying hot, clean zeolite treated soft water for back washing and rinsing the zeolite softener.

The present invention comprises a conventional hot process water softener including a wash water compartment for storing a supply of hot, clean zeolite treated soft water, means for delivering such water from the wash water compartment in reverse flow through the zeolite softener for backwashing it, means for delivering hot, clean zeolite softened water in normal flow direction through the zeolite softener for rinsing it together with means for maintaining the desired or required amount of hot, clean zeolite softened water in the wash water compartment and means for blowing off such accumulation from the wash water compartment.

With these and other objects in view, as may appear from the accompanying specification, the invention consists of various features of construction and combination of parts which will be first described in the accompanying drawing which show diagrammatically and partly in section the improved water treating apparatus embodying the invention, and the features forming the invention will be specifically pointed out in the claims.

The single figure is a view partly in section of a water treating apparatus embodying the present invention.

Referring particularly to the drawing a conventional type of hot process water softener is shown at 1 which includes a receptacle 2 in which the water is treated. Raw water prior to treatment is admitted into the top of the receptacle or shell 2 through the inlet pipe 3 and spray head 4 while steam is admitted into the top of the shell or receptacle 2 through the steam inlet 5 where it mingles with the hot water being sprayed into the shell and heats the water which is subsequently softened in the usual manner in the main body of the shell. The treated water leaves the shell through the upflow cone 6 and the outlet pipe 7. In the drawing, two hot zeolite softeners 8 and 9 are shown which are connected in series with the softener 1. These zeolite softeners 8 and 9 filter the effluent from the hot softener 1 and remove all residual hardness therefrom. The water outlet pipe 7 is connected to the zeolite softeners 8 and 9 through branch discharge pipes 10 each of which has a valve 11 therein and when the valves 11 are opened the treated water flows from the pipe 7 through the softeners 8 and 9 and out through the bottom of the softeners to outlet pipes 12. The outlet pipes 12 have a connection 13 with a suitable pipe 14 which leads to the suction of a transfer pump 15. The transfer pump 15 discharges the treated water through a pipe 16 to its point of use. This is the normal flow of water to be treated or being treated through the apparatus.

However, to maintain the proper efficiency of the hot zeolite softeners 8 and 9 it is necessary to regenerate the zeolite in the softeners 8 and 9 at predetermined intervals.

To provide water for backwashing the zeolite beds in the softeners 8 and 9 to remove accumulated floc therefrom a wash water compartment 17 is formed in the shell 2 by means of a partition 18. The partition 18 is shaped so that the bottom of the wash water compartment 17 is closed as shown at 18' while the top of the wash water compartment is opened to the space in the shell 2 into which the raw water is sprayed and into which the steam enters and thus the top of the wash water compartment 17 is open to the vapor space within the shell 2. Located a predetermined distance between the top and the bottom of the wash water compartment 17, and therein is a water withdrawal ring 19 which has a plurality of perforations spaced circumferentially thereabout. A pipe 20 is connected to the ring 19 and to the suction of the backwash pump 21 so that when the backwash pump 21 is operating water will be withdrawn from the wash water compartment 17. The discharge of the backwash pump 21 is through a pipe 22 which has connection through branch pipes 23 with the hot zeolite softeners 8 and 9 at the bottoms thereof. Valves 24 are interposed in the pipes 23 so that when the valves 24 are opened water from the wash water compartment 17 will be forced through the zeolite beds (not shown) in the hot zeolite softeners 8 and 9 in a reverse direction to the normal flow of the water therethrough. The wash water which is forced in a reverse direction through the softeners 8 and 9 issue therefrom through pipes 25 and branch pipes 26 into a pipe 27. Valves 28 are provided in the branch pipes 26. The pipe 27 discharges into a second annular perforated ring 29 which is located near the bottom of the wash water compartment. Due to the fact that the ring 29 is provided with a plurality of relatively small circumferentially spaced openings therein, the wash water returned to the wash water compartment 17 will together with the floc or sludge picked up from the zeolite beds issue slowly in rather quiescent state into the lower part of the wash water compartment 17. A sludge outlet valve 30 is also connected to the ring 29 so that by opening the valve 30 water and settled sludge may be drained from the bottom of the wash water compartment 17.

A by-pass pipe 31 connects to the pipe 7 and goes around or by-passes the hot zeolite softeners 8 and 9 and is connected to the pipe 14 between the outlets of the zeolite softeners 8 and 9 and the suction of the transfer pump 15. A valve 32 is interposed in the pipe 31.

A pipe 35 is connected to the outlet pipe 16 and to the pipe 20 and ring 19 for supplying hot, clean, soft zeolite treated water to the wash water compartment 17. A valve 36 is interposed in a pipe 35 outwardly of its connection with the pipe 20 and this valve 36 is a pressure operated valve structure of any suitable type which may be purchased upon the open market.

Suitable mechanism indicated at 37, of a float-operated type, which also may be purchased upon the open market, is connected to the valve 36 and is operated by variances in the water level in the wash water compartment 17 for opening and closing the valve 36 so that when the water level in the wash water compartment 17 falls below a predetermined amount or level the valve 36 will be opened to admit water from the discharge line 16 into the wash water compartment.

The basic operation of the water treatment apparatus during the process of regeneration of the zeolite softeners 8 and 9 is as follows:

The valves 11 are closed and the valves 13' in the outlets of the softeners 8 and 9 are also closed. The valves 24 and 28 are opened and operation of the backwash pump 21 is started which results in the backwashing of the zeolite beds (not shown) in the softeners 8 and 9 by hot, clean soft zeolite treated water withdrawn from the wash water compartment 17. The wash water is returned to the wash water compartment 17 through the pipe 27 and the ring 29. The backwash pump 21 is then shut off and a suitable regenerant such as a sodium chloride solution is injected into the softeners 8 and 9 through the pipes 40. The valves 24 are then closed and the valve 41 in the pipe 42 and the valves 43 are opened. The backwash pump is again started and hot, clean soft water from the wash water compartment 17 is taken by the backwash pump 21 and forced through the pipe 42 into and through the softeners 8 and 9 in the direction of the normal flow of water through the softeners. This rinse water is discharged to waste through valves 44 which control the waste outlet connections to the outlet pipes 12 of the softeners. After a sufficient lapse of time required for removal of the regenerant from the zeolite beds the backwash pump 21 is shut off. During this process water drawn from the wash water compartment 17 is made up through the automatic fill pipe or refill pipe 35 by the opening of the valve 36 due to the lowering of the level of the water in the backwash compartment. At necessary intervals the valve 30 is opened to withdraw sludge from the wash water compartment 17 and any water withdrawn through the sludge outlet valve 30 is made up by the opening of the valve 36 due to the lowering of the water level in the wash water compartment.

The complete cycle of regenerating of the hot zeolite softeners 8 and 9 may be arranged to work automatically or semi-automatically as shown by the wiring diagram embodied in the single figure of the drawings to provide such automatic or semi-automatic operation. The backwash pump 21 is driven by an electric motor 45, operation of which is controlled through a motor starter 46 of any approved type and by means of a momentary stop and start push button switch 47. A multiflex timer 48 is connnected in the circuit between the momentary stop and start push button 47 and the motor starter 46 and between the line current and a solenoid 49 which is provided for operating the valve 30. The multiflex timer 48 is adjusted to operate for a fixed length of time or rather to permit flow of current therethrough to the motor 45 for a fixed length of time so that when the push button switch 47 is operated it momentarily holds the circuit through to the multiflex timer 48 then snaps back into open position and the multiflex timer maintains current through the motor starter 46 and motor 45 for the length of time corresponding to its setting, after which it automatically cuts off operation of the motor and consequently stops operation of the backwash pump 21. The timer automatically resets to come into operation at the next starting of the backwash pump and thus after the prescribed period of backwashing of the softeners 8 and 9 the multiflx timer will again permit energizing of the motor 45 to operate the backwash pump 21 to circulate the rinse water through the filters 8 and 9 for the period required for such operation and as determined by the setting of the multiflex timer 48.

It will be understood that the invention is not to be limited to the specific construction or arrangement of parts shown, but that they may be widely modified within the invention defined by the claims.

What is claimed is:

1. In water treating apparatus a hot process water softener including a shell having an inlet for water to be treated and an inlet for steam at one end thereof and provided with an outlet for treated water, a partition in said shell forming a wash water storage compartment open at one end to the interior of the shell above the normal water level in the shell, a zeolite softener having an outlet for treated water, piping for delivering the treated water from the treated water outlet of the shell to said zeolite softener, a pump for withdrawing water from said wash water compartment, piping for delivering wash water from said pump to and through said zeolite softener in a reverse flow direction through the zeolite softener and back into said wash water compartment, and a pipe for delivering water from said pump to said zeolite softener for flow through the softener in a normal flow direction through the zeolite softener for rinsing it, piping for delivering treated water from said zeolite softener to said wash water compartment, and means controlled by variances in the level of water in the wash water compartment for controlling the delivery of treated water to the wash water compartment.

2. Water treating apparatus as claimed in claim 1 including a by-pass pipe from the outlet of said shell about said zeolite softener.

3. Water treating apparatus as claimed in claim 1 including a perforated ring in the lower portion of said wash water compartment, said piping for returning wash water from said zeolite softener to said wash water compartment connected to said ring whereby the returned wash water will be distributed in the wash water compartment.

4. Water treating apparatus as claimed in claim 1 including a perforated ring in the lower portion of said wash water compartment, said piping for returning wash water from said zeolite softener to said wash water compartment connected to said ring whereby the returned wash water will be distributed in said wash water compartment, and a second perforated ring in said wash water compartment spaced from said first ring and connected to the piping delivering water from the wash water compartment to the pump whereby wash water will be withdrawn from the wash water compartment at substantially the same rate as the wash water from the zeolite softener is returned to the wash water compartment.

5. Water treating apparatus as claimed in claim 1 including a perforated ring in the lower portion of said wash water compartment, said piping for returning wash water from said zeolite softener to said wash water compartment connected to said ring whereby the returned wash water will be distributed in the wash water compartment, and a sludge blow-off valve connected to said ring.

6. Water treating apparatus as claimed in claim 1 including a transfer pump for withdrawing water from said zeolite softener, a discharge pipe from said zeolite softener to transfer pump, the piping for delivering treated water from said zeolite softener to said wash water compartment being connected to said discharge pipe, a perforated ring in the lower portion of said wash water compartment, said piping for returning wash water from said zeolite softener to said wash water compartment connected to said ring whereby the returned wash water will be distributed in the wash water compartment, a second perforated ring in said wash water compartment spaced from said first ring and connected to the piping for delivering water from the wash water compartment to the first-named pump whereby wash water will be withdrawn from the wash water compartment at substantially the same rate as wash water from the zeolite softener is returned to the wash water compartment.

7. In water treating apparatus a hot process water softener including a shell having an inlet for water to be treated and an inlet for steam at one end thereof and provided with an outlet for treated water, a partition in said shell forming a wash water storage compartment open at one end to the interior of the shell above the normal water level in the shell, a zeolite softener having an outlet for treated water, piping for delivering the treated water from the treated water outlet of the shell to said zeolite softener, a pump for withdrawing water from said wash water compartment, piping for delivering wash water from said pump to and through said zeolite softener in a reverse flow direction through the zeolite softener and back into said wash water compartment, and a pipe for delivering water from said pump to said zeolite softener for flow through the softener in a normal flow direction through the zeolite softener for rinsing it, piping for delivering treated water from said zeolite softener to said wash water compartment, a transfer pump for withdrawing treated water from said zeolite softener, a discharge pipe from said transfer pump, the piping for delivering treated water from said zeolite softener to said wash water compartment being connected to said discharge pipe, means controlled by variances in the level of water in hte wash water compartment for controlling the delivery of treated water from the discharge pipe of said transfer pump to the wash water compartment.

References Cited in the file of this patent

UNITED STATES PATENTS

| | | |
|---|---|---|
| 1,276,629 | Duggan | Aug. 20, 1918 |
| 1,402,277 | Yoder | Jan. 3, 1922 |
| 1,638,803 | Gibson et al. | Aug. 9, 1927 |
| 1,697,835 | McGill | Jan. 1, 1929 |
| 1,763,784 | Hodkinson | June 17, 1930 |
| 2,263,398 | Robinson | Nov. 18, 1941 |
| 2,379,753 | Sebald | July 3, 1945 |
| 2,478,144 | Waugh | Aug. 2, 1949 |
| 2,523,523 | Robinson et al. | Sept. 26, 1950 |
| 2,528,613 | Sebald | Nov. 7, 1950 |

OTHER REFERENCES

Permutit Co. Bulletin, The Application of Zeolite Water Softeners to the Treatment of Boiler Feed Water, 1932 (p. 20 relied upon).